May 20, 1958 R. H. THORNER 2,835,237
GOVERNOR DEVICE
Filed Oct. 31, 1955 3 Sheets-Sheet 1

INVENTOR.
Robert H. Thorner
BY
ATTORNEYS

May 20, 1958 R. H. THORNER 2,835,237
GOVERNOR DEVICE
Filed Oct. 31, 1955 3 Sheets-Sheet 3

INVENTOR.
Robert H. Thorner
BY
ATTORNEYS

United States Patent Office 2,835,237
Patented May 20, 1958

2,835,237
GOVERNOR DEVICE

Robert H. Thorner, Detroit, Mich.

Application October 31, 1955, Serial No. 543,831

33 Claims. (Cl. 123—102)

This invention relates to a governor for controlling the speed of a rotating machine, and particularly for controlling the speed of an engine. This application is a continuation-in-part of my copending application Serial No. 59,109 filed November 9, 1948, now Patent No. 2,736,304 issued February 28, 1956.

Speed limiting governors for controlling automotive engines in the past have been plagued by a number of difficult problems. Centrifugal governors have never been widely used in high speed automotive engines as speed-limiting devices primarily because a special engine-driven element is required, and protective casings are necessary to make the linkages tamper-proof. The added cost of the drive as well as the difficulty in adapting the governor to a number of engines of different design makes this type of speed control virtually prohibitive for automotive engines when cost is a factor. Hydraulic governors (servo or direct) have never been widely used in automotive engines because of the necessary speed drive as well as the cost and complexity in providing a special fluid circuit. Electric governors have been available in which an engine-driven self-contained generator produces voltage varying with speed to operate a solenoid which in turn controls the throttle either directly or through a fluid servo-mechanism. Again the cost and problems of driving the generator by the engine as well as the high cost of the generator itself accounts for the fact that such governors have never been widely used in automotive engines.

In other forms of electric governors offered to the public, contact points are caused to operate as a function of engine speed to control electricity from the electrical system of the vehicle for actuation of a solenoid, which in turn effects speed controlling movements of the throttle. Such governors not only were costly, but the contact points rendered them unreliable; and they were dependent on the car battery which was undesirable from a reliability and tamper-proof standpoint when used as speed-limiting governors.

The type of speed-limiting control device most widely used in the past for automotive engines has been vacuum-velocity governors. The primary reason for their extremely wide past acceptance is that these governors use the intake manifold pressure and/or air-velocity (at fixed-throttle positions) as a speed-sensing function so that no separate speed drive or engine-driven element is required. Although I have obtained excellent regulation (up to isochronous) with the vacuum governor disclosed in my copending said patent application Serial No. 59,109, all vacuum governors have certain inherent undesirable characteristics not found in governors with engine-driven elements. Since with vacuum governors, the medium which produces the sensing function is intake passage air, the sensing function will be varied undesirably by any changes in air density as a result of either altitude changes or changes in the heat of the gas in the entire air-flow system from intake to exhaust. Also, since the intake passage vacuum is different at different throttle positions, a curve of engine speed plotted against manifold vacuum is different at each different fixed-throttle position. Thus all vacuum governors must use as a sensing function a "family" of such speed-vacuum "curves" taken at different fixed throttle positions, each curve having a different contour (slope or shape) than the other curves.

All governors using engine-driven elements to produce the sensing force as a function of speed operate along a single speed-force sensing curve which is substantially independent of throttle position. This characteristic of such governors permits a better range of speed adjustment without the calibration required of all vacuum governors because of the non-parallelism of the vacuum curves that vary with speed at fixed throttle positions (speed-vacuum) and the non-parallelism of the vacuum curves that vary with throttle position at various constant speeds (throttle-vacuum).

However, vacuum and/or velocity sensing governors have the highly desirable feature of merely "tapping" a speed-varying pressure as a speed sensing function, which pressure variation is already inherent in the engine thereby avoiding the severe problem (for automotive application) of providing an engine drive and the provision of mechanism in the governor driven thereby. This is the primary factor underlying the fact that intake-vacuum-sensing governors in the past have been by far the most widely used for speed-limiting controls in the automotive field.

Furthermore, all automotive speed-limiting governors regardless of their method of speed-sensing, have been installed in one of two ways. In one form known as a "sandwich" governor, a separate governor unit including a separate governor throttle is intercalated between the carburetor and intake manifold. In this form of speed-limiting governor, the governor-throttle controls the engine to a predetermined (maximum) governed speed whenever the operator tries to exceed this speed by opening the carburetor throttle. In the second form of governor, known as the "carburetor-governor" type, the governor mechanism is "built in" as an integral part of the carburetor itself. In this form, the governor mechanism directly activates the carburetor throttle by means of an "over-ride" mechanism, so that only one throttle is used to control the engine.

The main justification of the widespread use of sandwich governors in the past is their ability to be inserted in the engine without modifying the carburetor; also the responsibilities of the governor manufacturer could be clearly defined in view of the responsibilities of the carburetor builder when both are selling units to an engine or truck manufacturer. However, sandwich governors require linkage revision and longer studs, thereby raising the carburetor which reduces the air-cleaner-to-hood clearance. Much worse, the location of the second (governor) throttle on the downstream side of the carburetor throttle tends to disrupt the proper fuel distribution as worked out for the carburetor without a governor.

In the past when the top governed speeds were about 2800–3000 R. P. M. for most engines the advantages of sandwich governors outweighed the disadvantages. However, in view of the increased air-flow range of present high-speed engines which are governed at speeds up to 3800 R. P. M. or higher, the effect on power of the second (governor) throttle in disturbing fuel distribution becomes more pronounced. This factor coupled with the ever-lowering hoods in automotive vehicles virtually precludes the use of sandwich governors in many installations. For such installations, the governor may be built-in as a carburetor-governor combination.

However, the build-in governors also have several undesirable inherent characteristics. In order to accommodate the governor, the carburetor body casting must be revised only for those carburetors taking governors. In addition, in order to keep the size of the governor mechanism to a minimum so it may be attached to the carburetor, the throttle shaft must be mounted on friction-reducing bearings. In some of the present carburetors for engines (which cannot use sandwich governors), the carburetor height has been reduced to such an extent to make it extremely difficult, if not impossible, to attach the governor mechanism to the carburetor in view of space limitations adjacent the carburetor. Furthermore, these carburetors at present are frequently of the four-barrel type so that a special carburetor body for receiving a governor is fairly costly. If such carburetor-governor combinations are in very high production, then the cost of a "built-in" governor may be justified providing space is available at the carburetor.

A primary object of the present invention is to provide a governor device for a machine or engine in which the speed-sensing mechanism does not require a separate rotating engine-driven element, but utilizes any rotating or reciprocating part of the engine itself as a means for generating the forces varying as a function of speed to activate the sensing means of the governor, and further in which sensing means is completely independent of variations of intake air density and provides only a single speed-force variation curve independent of the position of the control member.

Another object of the present invention is to provide a governing device of the type recited in the foregoing paragraph in which the speed-sensing mechanism is disposed to produce a small but consistent force varying as a function of speed to act on the combination of a sensing element and a pilot valve biased by reacting force means whereby the elements of said combination are sufficiently frictionless and sensitive that the servo-motor controlled by the pilot valve regulates the control means in a manner to provide satisfactory and reliable speed-regulation.

Still another object of the present invention is to provide a governor device of the type recited in the foregoing paragraph in which the said speed-functional force-variation may be very small and a mechanism is connected to and operates with the control means to act on the pilot valve and sensing element combination to compensate for the undesirable factors acting thereon as a function of load or control-means-position, which factors may be large percentagewise in relation to the small speed-varying force.

Another important object of the present invention is to provide a speed-limiting governor device which includes a unique throttle over-ride mechanism whereby the governor may be installed to operate the carburetor throttle without any revision of a standard carburetor and without the governor being interposed between the carburetor and intake manifold.

A further object of the present invention is to provide a governor mechanism for an engine in which governor the intake passage vacuum is directed to a pilot-valve which in turn directs all or part of said vacuum to a servo-motor for activating the governor throttle, and pressure regulating means are provided in the vacuum communication between the intake manifold and the governing mechanism, per se, for transmitting substantially constant pressure to the pilot valve, thereby eliminating the undesirable effects on the valve which would be produced by the variation of manifold vacuum as the throttle position is varied.

An additional object of the present invention is to provide, in a speed-limiting governor for automotive engines, manual means operable by the driver to release the governor instantly in an emergency.

A further object of the present invention is to provide a governing device in which the speed-sensing mechanism includes electro-magnetic means to produce a magnetic force, which force may very slightly as a result of changes in electrical resistance with changes in ambient temperature, and which governor includes temperature-sensitive means to compensate for the said variation.

Other objects and advantages of the invention will become apparent from the following description and from the accompanying drawings, in which—

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not limitation.

In the primary inventive concept of the present invention, I provide means which when combined with a magnetically permeable movable part of the engine, becomes an electric generator for producing power which is used to operate the plunger or armature of a solenoid, which armature activates a pilot valve of the governor to effect speed-controlling movements of a servomotor. In such construction, I provide an electro-magnetic means (sensing-force-producing unit) which may be mounted near any magnetically permeable rotating or oscillating element already a part of the engine to produce said power. In this manner, the rotating (or reciprocating) element of the generator consists of an element already a part of the engine so that no separate engine drive or engine driven generator is required. Such construction of the sensing unit within the permissible space and cost limitations will produce a very small but consistent variation of electric power varying with the speed of rotation (or reciprocation) of the engine. In furtherance of the primary inventive concept, I provide in the governor a speed-sensing mechanism comprising a pilot valve and its activating armature all biased by means such as a spring, which sensing mechanism is sufficiently consistent and sensitive to minute changes in said speed-varying power to reproduce flawlessly (but substantially enlarged) the speed-varying forces which act on the solenoid armature.

In furtherance of the inventive concept for those engines and machines in which extremely close regulation is required, I provide novel means to compensate or eliminate the disturbing factors acting on the pilot valve as the position of the control means changes. Such compensating means may comprise mechanism activated by the control means to produce compensating forces acting on the sensing mechanism as a function of movement of the control means. Another form of such compensating mechanism, for use primarily when air under engine vacuum is the power fluid (or when any fluid having varying source pressures is used), consists of a pressure regulating mechanism for maintaining substantially constant pressure vacuum to the pilot valve.

In the drawings there is shown by way of example a portion of an automotive vehicle embodying the present invention. Although the governor is there illustrated as a speed-limiting device for automotive engines, the governor principle would be unchanged for the purposes of this disclosure if the governor is used as an automatic throttle (non-speed limiting) for automotive engines such as in passenger cars and farm tractors; or it may be similarly used for controlling the speed of rotation or rate of oscillation of any rotating or reciprocating elements, respectively, in any kind of machine, such as pumps, turbines or motors and machinery of any kind.

Also in the form shown by way of example, the governor is illustrated as installed on a reciprocating internal combustion engine to control a conventional butterfly throttle in the intake manifold. The governor principle is unchanged if the control means of the governor regulates speed by actuating a valve in the fuel system of a gas turbine engine or by a fuel metering rack and injectors of a diesel engine, or the control valve of a distributor-type fuel-injection engine, etc. Also, the working fluid of the servo-mechanism in the form of my invention shown herein by way of example is air under the influence of intake manifold vacuum, although the governor may be arranged to use engine oil (or fuel oil in a diesel or in any fuel-injection engine), or any available source of fluid under pressure or vacuum. In this disclosure "vacuum" will usually be referred to in terms of absolute pressure.

Figures 1, 3, 6, 7:
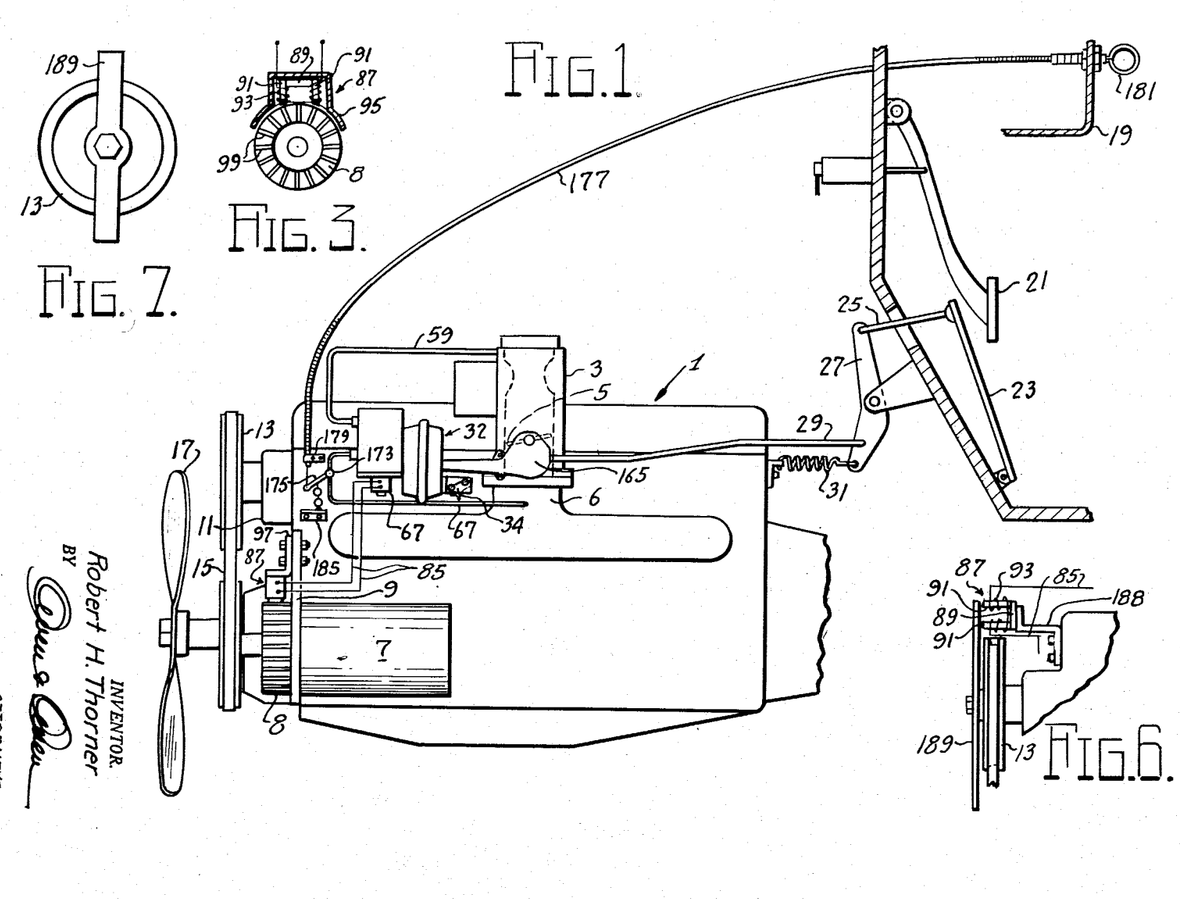
Fig. 1 is a side elevation view of a typical installation of my governor device shown in its operative position in an automotive vehicle, the vehicle parts being diagrammatically indicated in section.
Fig. 3 is a somewhat diagrammatic view of the sensing unit shown in Fig. 1.
Fig. 6 is a fragmentary portion of Fig. 1 showing a modified form of sensing-force producing means.
Figs. 7–13 are somewhat diagrammatic views illustrating typical installations of the electro-magnetic speed-sensing unit.
Figures 2, 2A, 4, 5:
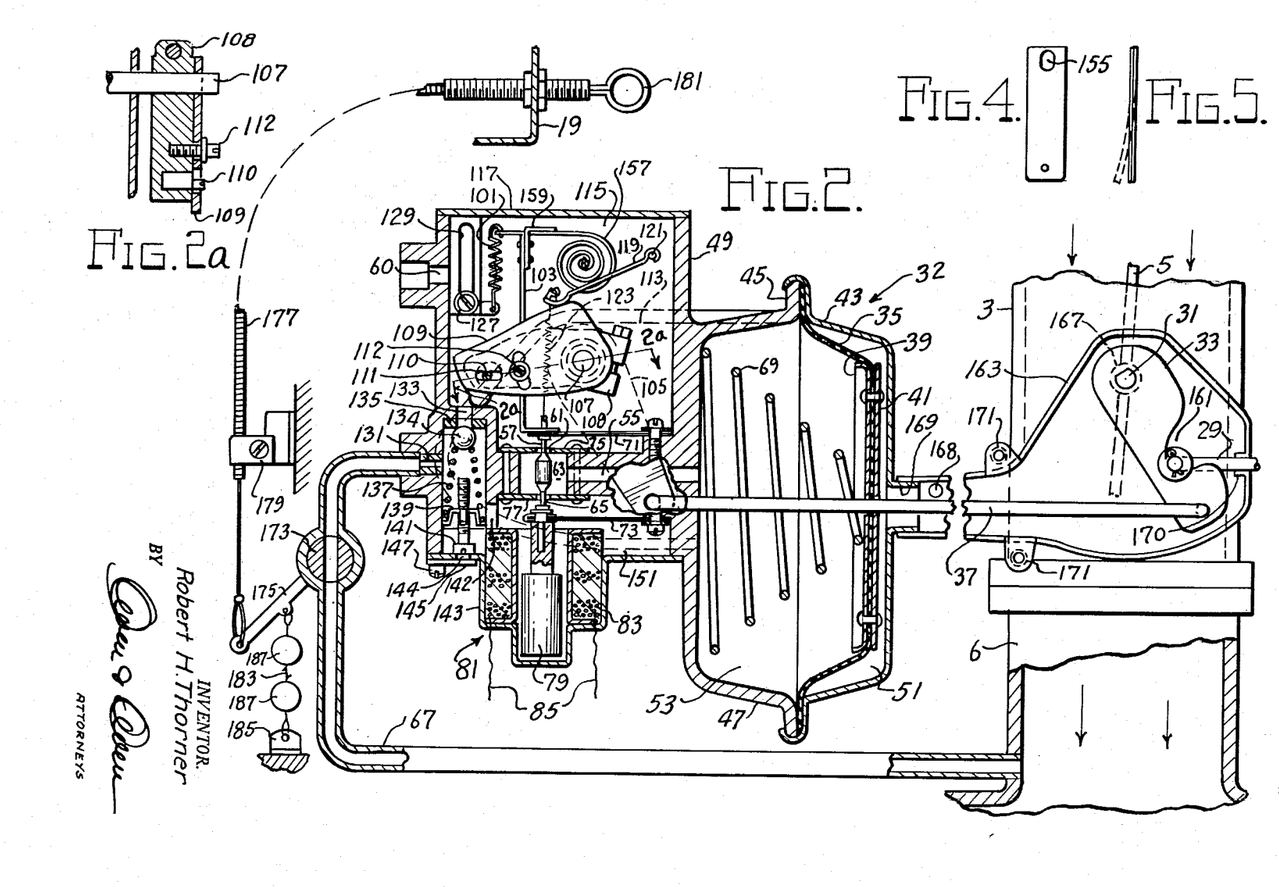
Fig. 2 is a somewhat diagrammatic sectional view of the governor device of the present invention shown in Fig. 1.
Fig. 2a is a section on line 2a—2a in Fig. 2.
Figs. 4 and 5 are respectively front and side views of a leaf spring element of the type used in the governor device of Fig. 2.

Referring to the drawings, and particularly to Figs. 1 and 2, the governor is shown by way of example installed on a reciprocating internal combustion engine in which an engine 1 has a carburetor 3 and its throttle 5, an intake manifold 6, an electric generator 7 and its cooling fan 8 supported by a bracket 9, a water pump 11 and its pulley 13 driven by a fan belt 15 which drives an engine fan 17. In Fig. 1, a portion of the vehicle is shown such as the instrument panel 19, brake pedal 21 and accelerator pedal 23. The linkage mechanism connecting the throttle 5 for activation by the accelerator pedal is exemplified by a link 25, lever 27 and a throttle-actuating link 29, which mechanism is biased by a spring 31 urging the throttle and accelerator towards the idle position. All of the foregoing is a normal part of any automotive vehicle having a reciprocating internal combustion engine and is well known to those skilled in the art and hence needs no further discussion.

Again referring to the structure shown in Fig. 2 a sectional view of the governor mechanism 32 illustrated in Fig. 1 (secured to the engine by a bracket 34) is shown in section somewhat diagrammatically. As shown in Fig. 2 the throttle 5 is supported by a throttle shaft 31 rotatable therewith. A throttle lever 33 is connected to and rotates with the throttle shaft, and is actuated by a pressure responsive member such as a diaphragm 35 by means of a link 37 conneced to the throttle lever. In the form shown the diaphragm is of the molded type securely clamped between the disc members 39 and 41 by any suitable clamping means such as by rivets as shown. The diaphragm is connected to the link 37 by silver soldering or brazing the disc member 41 thereto. The periphery of the diaphragm is clamped by a cover 43 rolled around the flange 45 of the casing 47 which is part of a housing 49, but any suitable securing means may be used to hold the diaphragm. The diaphragm 35 in cooperation with the cover 43 and casing 47 forms a chamber 51 which is exposed to atmospheric pressure on the right side of the diaphragm, as viewed in Fig. 2, and chamber 53 which is subjected to modulated diaphragm vacuum through passage 55 controlled by a pilot valve 57 to be discussed.

In the fluid bleed circuit controlled by the pilot valve 57, air from the outside atmosphere, or as shown in Fig. 1 from the carburetor intake, enters the governor through a tube 59 and flows unrestrictedly through a port 60 and a variable orifice or valve 61 through a chamber 63 which is part of chamber 53, through a second variable orifice or valve 65 where it flows through a tube 67 which is subjected to the full manifold vacuum, whereupon the air flows into the intake passage 6 and joins the air-flow to the engine. The pilot valve 57 has two tapered faces which form the variable orifices 61 and 65 such that one variable orifice or valve opens while the other variable orifice or valve simultaneously closes. In this manner the pilot valve modulates the pressure in chamber 63 to any value of pressure between the atmospheric pressure entering orifice 61 to the full value of the vacuum at the outlet of orifice 65. The pressure in chamber 63 is statically transmitted through conduit 55 to chamber 53 so that the pressure acting on the diaphragm 35 is the same as in chamber 63 under the control of the pilot valve. The diaphragm 35 is biased by a spring 69 tending to move the throttle 5 towards the open position in opposition to the vacuum on the diaphragm controlled by the pilot valve. Thus, as the pilot valve moves it causes the vacuum in chamber 53 acting on the diaphragm to vary correspondingly, whereby the movement of the diaphragm is substantially a function of the movements of the pilot valve. Accordingly the pilot valve 57 causes amplified but corresponding movements of the diaphragm 35 with greatly amplified forces.

The pilot valve 57 is suspended in air without metal-to-metal contact during its operative movements by means of leaf spring members 71 and 73 which permit substantially frictionless movement of the valve in its axial direction but prevent movement transverse thereto. The orifices 61 and 65 are formed in opposed plate members 75 and 77, respectively, which are secured to the housing by suitable means as by rivets as shown. The leaf springs 71 and 73 are secured by the screws shown projecting through elongated openings in the leaf spring (see Fig. 4) to permit free movement thereof while tightening the screws.

The pilot valve 57 is actuated by a plunger 79 of a solenoid 81, the plunger being also supported by the leaf springs 71 and 73 for substantially frictionless movement with the pilot valve. The solenoid includes a coil 83 connected by wires 85 to a sensing unit 87 as shown in Figs. 1 and 3. The sensing unit as shown best in Fig. 3 comprises a permanent magnet 89 mounted in contact with two pieces or "legs" of soft iron 91 which carry a field coil 93 for connection with the wires 85. To prevent tampering the entire unit is encased in a housing 95 (not shown in Fig. 1). The assembly is rigidly supported by a bracket 97 which is secured to the generator bracket 9 by suitable clamping means as by the bolts shown. The unit is located so that the soft iron legs 91 alternately align with the fins 99 of the generator fan 8 as the generator rotates during its normal operation. The ends of the soft iron legs are mounted with a small clearance with respect to the fins 99 such as .025 inch. With such a construction, as the generator fan rotates in its normal operation, the magnetic circuit is "made" or completed through the magnet 89, iron legs 91 and generator fan. When the fins are in a position out of alignment with the soft iron legs, the magnetic circuit is interrupted or "broken" thus producing a large change in flux through the coil 93 and generating a voltage in the circuit 85 and solenoid coil 83. In this manner the alternate "making" and "breaking" of the magnetic circuit of the sensing unit 87 produces a voltage in the coil 83 which varies as a consistent function of the engine generator speed and hence of the engine speed. As the speed of the engine increases, the magnetic force on the plunger 79 increases and urges the pilot valve 57 in an upwardly direction as viewed in Fig. 2. This force is opposed by a speed-adjusting spring 101 acting downwardly against the pilot valve through the force-transmitting member 103.

Before the operation of the complete governor can be explained, it is necessary to consider the effects of the variation of manifold vacuum acting on the pilot valve 65 as the throttle position varies, which vacuum is hereinafter referred to as "throttle vacuum." The magnetic force produced by the plunger 79 may be small percentagewise in relation to the large change in vacuum acting on the exposed area of the pilot valve at orifice 65 as the throttle varies. Hence means may be provided in the governor to compensate or eliminate such undesirable variation in pilot-valve-unbalance forces in order to make the governor substantially speed-sensitive. Referring to Fig. 2, the link 37 extends to connect with a lever 105 which revolves a shaft 107 carrying a cam support 108 and a cam 109 secured thereto. The angular position of the cam is adjustable around the axis of its shaft 107 by turning an eccentric 110 mounted in the cam support 108 with the screw head of the eccentric projecting through the slot 111 of the cam 109. The angular position of the cam 109 is selectable to set the speed-droop of the governor. After the desired angular position is established, the cam is locked by tightening the screw 112 which screws into the cam support 108 through an arcuate slot in the cam as shown in Fig. 2a.

The lever 105 is installed in a cavity 113 which is formed in the housing 49 and comprises a part of the chamber 53. A lever shaft 107 extends through and seals the cavity 113 from the chamber 115 enclosed by a cover 117; and the cam 109 and cam support are installed in chamber 115. Thus the rotary movements of the cam 109 correspond to the rotary movements of the throttle 5. A cam follower 119 is hinged at a pin 121 and is disposed to follow the contour of the cam 109 for varying the force of a compensating spring 123 which connects with the cam follower and pilot valve as shown. The spring 123 is of lower rate than the main speed spring 101.

The operation of the device as a speed governor is as follows: As the engine speed increases, the power output of the speed sensing unit comprising the field coil 93 increases and the increased magnetic force on the plunger 79 moves the pilot valve 57 upwardly which increases the vacuum acting on the diaphragm 35, moving it to the left against spring 69 which in turn reduces the opening of the throttle thereby tending to restore the governed speed. Such movement continues until the force of the plunger 79 is balanced by the increased force of the spring 101 which action normally would produce a slight speed-droop since a set change in the position of the pilot valve is produced. However, the slight partial closure of the throttle has increased the "throttle-vacuum" acting downwardly on the pilot valve whereby the vacuum transmitted to the diaphragm 35 may not be as high as would normally be produced with a constant pressure (or vacuum) applied to the pilot valve. A slight natural compensation for this factor is effected if the vacuum in chamber 63 is increased as the "throttle vacuum" at the orifice 65 increases, despite the fact that the orifice 65 is more restricted and the orifice 61 is less restricted. This throttle vacuum effect may be compensated if necessary as well as other inconsistent factors acting on the pilot valve, by the simultaneous rotary movement of the cam 109 which extends the compensating spring 123 in a predetermined relationship with the movement of the throttle. Hence, the partial closure of the throttle causes the spring 123 to increase the upward force on the pilot valve to compensate and cancel the downward force on the valve produced by the throttle vacuum, and conversely. The cam may be formed to any desired contour to compensate for the effect of any other disturbing forces acting on the pilot valve.

Another important purpose of the cam mechanism is that by properly profiling the cam contour, the spring 123 can be made to compensate for the normal speed-droop of the governor whereby the governor regulation can be made extremely close, and even isochronous if desired. By providing a compensating spring 123 which is separate and of lower rate than the spring 101, a "soft" adjustment or calibration of the cam is effected whereby the tolerance of the cam contour is not critical. The governed speed is selected by varying the force of the main spring 101, which is adjusted by unlocking a clamping screw 127 and resetting a main spring retainer 129 to a new position, and again locking the screw. The spring 101 may be made with a very low rate in order to give close governor regulation without any reset mechanism, or at least only with the pressure regulator device to be described.

Another method of compensating for the "throttle vacuum" acting on the pilot valve is also shown in Fig. 2. In this method, a pressure regulator is interposed between the intake-manifold-vacuum (in tube 67) and the pilot valve orifice 65 in order to maintain a substantially constant vacuum acting on the pilot valve; such constant vacuum may be 3–5 inches of mercury, for example, and at lower vacuums as at wide-open throttle, the effects on the valve of the variation from about two inches of mercury to 3–5 inches of mercury are negligible.

In Fig. 2 the pressure regulator illustrated therein is an application of the bleed principle of pressure control as discussed on pages 34 and 35 of my book "Aircraft Carburetion" published in 1946 by John Wiley & Sons, New York. In this principle, two restrictions are in series in which at least one is variable to control the pressure between the two restrictions as the air flows or "bleeds" through the circuit. In Fig. 2 a fixed restriction 131 is in series with an orifice 133 whose opening is controlled by a regulator valve 134 having a seat 135 and which is biased by a spring 137. A retainer 139 positions the other end of the spring 137 whose biasing force is determined by setting a screw 141 which cooperates with the threaded portion of the retainer for manually positioning the spring. The retainer 139 is cross-shaped in order not to restrict the air flow from the pilot-valve 57. Also, an aperture 142 is provided in the casting to be sure there is no restriction of air. The screw 141 abuts against a cover 143 and may be adjusted through an opening 144. A sealing-plate 145 is locked by a screw 147 to render the adjusting screw 141 tamper-proof. This structure produces a second (pressure regulating) air bleed circuit in parallel with the main circuit past the pilot valve. In the second circuit, air from the tube 59 (or the outside atmosphere) flows through the port 60, past the regulator valve 134 where it joins the air from the pilot valve and flows through the restriction 131 and thence to the intake manifold 6 through the tube 67. The regulator (ball) valve always seeks a position to balance the force of the spring 137 against the force produced by the pressure differential across the exposed area of the regulator valve. Since the atmospheric pressure in chamber 115 is constant and the spring 137 is of fairly low-rate and the regulator valve travel is short, the pressure (vacuum) in chamber 151 between the regulator valve and restriction 131 is maintained at a predetermined constant value, such as 3–5 inches of mercury. Thus the purpose of the pressure-regulating mechanism is to provide a substantially constant vacuum to be transmitted to the pilot valve at the orifice 65 irrespective of the large variation of vacuum in the tube 67 and intake manifold as the throttle position varies from no-load to full-load (throttle-vacuum). Hence in this manner the pressure regulating mechanism eliminates the effect of "throttle vacuum" acting on the pilot valve. The desired constant vacuum at the pilot-valve is selected by setting the screw 141.

The compensation for "throttle vacuum," when necessary, may be effected either by the throttle-controlled mechanism (cam 109, spring 123, and follower 119) alone, or by the pressure regulating mechanism alone. Or for very close regulation over an extremely wide speed range the two compensating mechanisms may be used together as shown in Fig. 2. If a fluid source normally at a constant pressure is available for the power fluid circuit, no compensation is required for "throttle vacuum."

Although the fluid used in the power circuit of the illustrated form of the invention is air under engine vacuum, if liquid such as oil or air under a positive pressure are used, the regulating mechanisms above described would serve to eliminate at the pilot valve any effects thereon of the variations of pressure of the working fluid as it enters the governor.

Thus the over-all governor mechanism described above comprises an electric generator in which the rotating (or reciprocating) part of the generator is a normal part of the engine itself thereby simplifying the method of obtaining a sensing force that varies with engine speed. Such a generator may not be as efficient as a separate and efficiently designed engine-driven generator since a rotating (or oscillating) part of the engine is used which has not been designed specifically for that purpose. Hence the speed-varying forces are not large, but the frictionlessly supported sensing mechanism (pilot valve 57, plunger 79, and springs 101 and 123) is so sensitive that such small speed sensing forces may be amplified and reproduced flawlessly and consistently.

In past governors using separate electric generators, the generators are engine driven and are very large in order to minimize percentagewise by "brute force" the disturbing factors that vary with load such as aerodynamic and aerostatic forces on the throttle, excessive speed-droop, and the effect of "throttle vacuum" acting on the pilot valve, etc. Such generator installations are bulky, complex, and far too costly for the highly competitive automotive market. Because of the frictionless and extremely sensitive and consistent sensing mechanism, an extremely small and simple, and hence low cost, generator and solenoid may be used in which the speed-sensing forces are not large providing the disturbing factors are cancelled out by mechanism activated by the control means and/or by other means such as by a pressure regulating mechanism as shown.

This inventive combination permits the use of relatively small and low-cost permanent magnets and solenoids, and is completely independent of the electrical system of the engine.

Referring again to Fig. 2, means are provided if desired, to compensate for the very slight effect of ambient temperature on the resistance of the wire in the electric circuit, the resistance increasing with ambient temperatures. Such increase in wire resistance reduces the current in the solenoid for a given speed whereby the pilot valve would not be raised as high as expected, as viewed in Fig. 2. To compensate for this effect, the leaf springs 71 and 73 are shown made of bi-metal and installed such that they tend to raise the valve as the temperature increases. The slight additional force added thereby compensates for any undesirable effects of ambient temperature on wire resistance. The bimetal leaf spring is shown in plan view in Fig. 4, and clearly shows the elongated hole 155 to facilitate self-aligning seating of the pilot valve by alternately holding each tapered face against its respective seat and tightening its respective locking screw. The effect of ambient temperature on the leaf spring in its free position is shown in Fig. 5; although in the actual governor the leaf spring is constrained from such bending, it adds a slight temperature-compensating force to the pilot valve. If still more temperature compensation is needed, a separate coiled bi-metal element 157 may be provided, as shown in Fig. 2, wherein the end thereof abuts upwardly against a lug-member 159 secured to the end of the force-transmitting-member 103. For some applications of the governor, temperature compensation is not required. It would be used primarily for precision speed control where extremely close and consistent regulation with a wide variation in ambient temperature is encountered, or to compensate for the undesirable temperature effects of the viscosity and density of any liquid used as the power fluid instead of air. If temperature compensation is not desired, the leaf springs may be made of stainless steel, phosphor bronze, or beryllium copper, etc.

The governor of the present invention is shown in Fig. 2 with a unique over-ride mechanism which permits the governor to be installed to operate any standard carburetor throttle without revision to the carburetor itself. The reasons why a governor is "built-in" or attached to a carburetor are (1) to provide a source of vacuum for the power circuit, (2) to provide bearings for the throttle shaft so the diaphragm (or equivalent servo-motor) can be small enough so that the governor may be attached to the carburetor within the limited space available, and (3) to provide a governor override mechanism which is usually installed on the opposite end of the carburetor shaft from the governor mechanism, thus causing more carburetor revision.

In the govenor of the present invention, the vacuum source is provided by the tube 67 as already discussed; for speed-limiting governors, the tube would be sealed by standard governor seals, of course. The governor mechanism is secured to a fixed support such as the engine by the bracket 34 (Fig. 1) by any securing means as by screws or bolts which, for speed-limiting governors, must be sealed with standard governor seals as illustrated. The power member of the governor may be directly connected to the throttle lever 33 by the link 37, as shown in Fig. 2, to actuate directly the carburetor throttle without change in the carburetor. This may be accomplished by making the diaphragm area sufficiently large to overpower any friction in the throttle shaft as well as the effects of aerodynamic and aerostatic forces on the throttle itself, so that special anti-friction bearings are not required.

The entire result discussed in the foregoing paragraph is made possible in speed-limiting governors by the uniquely simple over-ride mechanism and the means for sealing same to prevent tampering. In Fig. 2, the throttle lever 33 includes an open portion 161 so disposed that the end of the lever 33 can move freely with respect to the throttle actuating rod 29 from the accelerator pedal 23. At all speeds less than the governed speed, the diaphragm spring 69 holds the throttle lever 33 against the end of the rod 29 so that in effect the accelerator is directly connected to the throttle at all speeds below governed speeds. When the driver of the vehicle depresses the accelerator to a position that would exceed the governed speed, the pilot valve 57 transmits sufficient vacuum to the diaphragm 35 that the lever 33 is pulled away from the end of the rod 29 (which is then positioned to the right as viewed in Fig. 2) and the engine is then completely under the control of the governor. The operator can return the engine to any speed below the governed speed or to idle by merely releasing the accelerator pedal to any desired position, and the end of the rod 29 will push against the lever 33 and move the throttle toward a reduce-speed position; this is true because the return spring 31 (Fig. 1) is much stronger than the diaphragm spring 69.

Very simple means are provided to render the override mechanism tamper-proof. Referring to Figs. 1 and 2, a stamped metal casing comprising two sections 163 shown in Fig. 2 and the cover section 165 shown in Fig. 1. The two sections are mated and are symmetric except for the opening 167 in the section 163 so it can fit over the throttle shaft, and also an air vent hole 168 is provided. The left end of the two sections fits over a projecting portion 169 of the cover 43. Also the sections have half-openings 170 to receive and guide the rod 29 from the accelerator. The sections are provided with mating ears or flange-portions 171 to be screwed together by suitable means and rendered tamper-proof by governor seals (not shown).

Although the form of my governor shown in Figs. 1 and 2 has the advantages described above, the governor may be made as a sandwich governor if ever desired, or it can be attached to the carburetor as a built-in part thereof, which might be desirable on smaller engines wherein the high production would justify the extra cost of revising the carburetor to receive the governor.

It is important to appreciate that from a reliability standpoint it is desirable to take air for the governor from the carburetor intake or air cleaner outlet (not shown) in order to have clean air flowing through the fluid circuit. However, from a function or operative standpoint, it makes no difference whatsoever whether the tube 59 to the air cleaner is used or the air is taken from the surrounding atmosphere.

Another feature which may be used with the speed-limiting governor of the present invention is the provision of means to release the governor in an emergency. Referring to Figs. 1 and 2 a valve 173 having a valve lever 175 is installed in the vacuum tube 67. A flexible cable 177 is secured to the engine by a clamp 179 and to the instrument panel 19 by conventional clamping means as shown. A release ring 181 is provided so that in emergency the operator can pull the wire which connects to the lever 175 to close the valve 173. The closing of the valve shuts off all vacuum to the governor so the spring 69 instantly moves the throttle 5 to its wide-open position. A soft piece of thin wire 183 secures the lever 175 in the position shown to a fixed bracket 185 (which is sealed) and the wire is sealed by standard governor seals 187. Thus in order to release the governor, the operator pulls the ring and breaks the wire 183 so that the governor is inoperative, and the throttle instantly can be moved by the full control of the accelerator to any speed. For truck fleets, a record of the number of such broken emergency seals per year are kept for each driver; and after a predetermined number of broken seals in any one year the company may take disciplinary action for reckless driving if it desires.

It is significant that the sensing unit 87 may be mounted near any magnetically-permeable part of the engine that moves in relation to engine speed. Figs. 6–13 are other examples in addition to those already discussed showing typical "taps" for speed sensing by properly installing the sensing unit.

Figs. 6 and 7 show a portion of the engine of Fig. 1 with the sensing unit 87 secured thereto by means of a bracket 188. The sensing unit parts are numbered as shown in Figs. 1 and 3 and the "legs" 91 are positioned to be intermittently adjacent the surfaces of a soft iron strip member 189 which is connected to rotate with the water pump pulley 13. Such rotation of the strip member intermittently "makes" and "breaks" the magnetic circuit through the sensing unit thereby generating a voltage as a function of speed. Instead of a metal strip separately bolted to the pulley as shown, it may be secured to the pulley itself by suitable means as by rivets, screws, spot welding, etc., or by stamping holes in the pulley itself thereby giving the equivalent structure as shown in Figs. 6 and 7.

Figure 8:
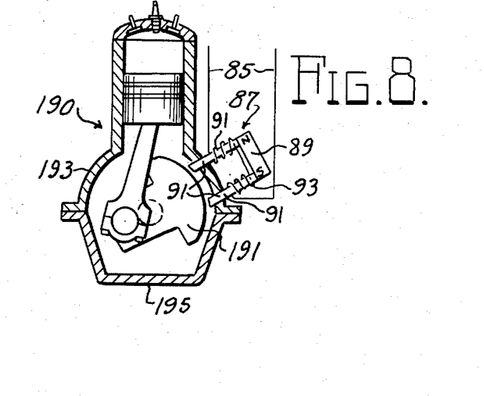

In Fig. 8, an engine 190 with its piston, connecting rods and crank-throw 191 is illustrated. The sensing unit, with its parts numbered as shown in Figs. 1 and 3, is mounted in the engine block 193 so its legs 91 are adjacent the crank-throw as the crankshaft rotates whereby the crank-throw "makes" and "breaks" the magnetic circuit to produce a voltage varying with speed.

Figure 9:
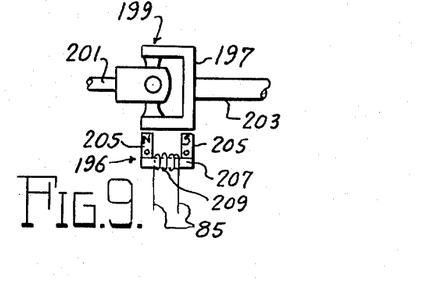

Fig. 9 shows how the governor may be used to sense road-speed instead of engine speed. The sensing unit 196 is mounted near one of the yokes 197 of the universal joint 199 of a conventional automotive vehicle. The transmission outlet shaft 201 drives the joint 199 and propeller shaft 203. The sensing unit is shown revised slightly, which may be done in any speed "tap," wherein two permanent magnets 205 are used as legs joined by a soft piece of iron 207 carrying the field coil 209. The magnetic circuit is "made" and "broken" by the intermittent alignment of the "prongs" of the yoke 197 with respect to the ends of the magnets 205 as the joint revolves in accordance with road speed. Also, in order to have the governor controlling road-speed, the sensing unit may be installed adjacent any moving part of the differential or wheels of the vehicle.

Figure 10:
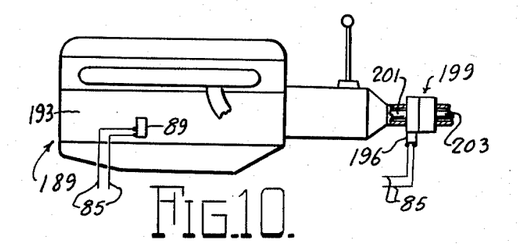

Fig. 10 shows the relationship of the two speed "taps" shown in Figs. 8 and 9 with respect to an engine. The speed sensing units 87 and 196 are shown in the engine block 193 and universal joint 199, respectively, in relation to the transmission with the numbers corresponding to those in Figs. 8 and 9.

Figure 11:
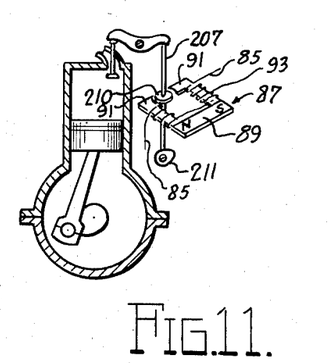

Fig. 11 shows still another method for installing the sensing unit 87 (with parts thereof numbered as in Figs. 1 and 3) in relation to reciprocating movements of a valve push rod 207 of the engine. A small soft iron disc 210 is secured to the rod 207 and aligns with inturned ends of the legs 91 of the sensing unit in one position of the rod whereby the magnetic circuit is "made"; and as the valve cam 211 revolves, the rod and disc move out of alignment with respect to the legs 91 whereby the magnetic circuit through the sensing unit is "broken" thus generating a voltage varying with speed.

Figure 12:
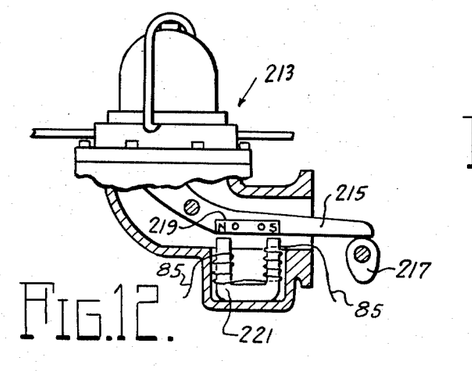

Fig. 12 shows the sensing unit installed in any conventional automotive fuel pump to sense the rate of oscillation of the pump drive lever 215 produced by the cam 217 as a function of engine speed. The sensing unit is modified somewhat and may be applied to any of the other speed "taps" shown herein. In Fig. 12, a permanent magnet 219 is secured to the lever 215 for movements therewith. A U-shaped piece of soft iron 221 is mounted to be close to the magnet in the downward position of the lever 215 to "make" the magnetic circuit through the sensing unit, and to "break" the magnetic circuit in the upward position of the lever, thus generating a voltage that varies with speed.

Figure 13:
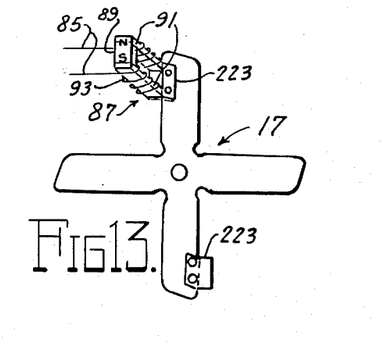

Fig. 13 shows the sensing unit 87 installed adjacent the engine cooling fan 17 of Fig. 1, and the numbers of the parts of the sensing unit correspond to those in Figs. 1 and 3. Soft iron tabs 223 may be secured by suitable fastening means as by rivets to two opposing blades of the fan to provide an optimum flux path for the magnetic circuit through the sensing unit. As the fan revolves, the magnetic circuit through the sensing unit is alternately "made" and "broken" as the blades pass by the unit to generate a voltage varying as a function of engine speed. Similar soft iron tabs may be secured to any other of the movable parts of the engine used to generate voltage in order to increase the amount of flux in the magnetic circuit when the sensing unit circuit is closed or "made." Such soft iron tabs may be desirable since hardened metal or cast iron is not as permeable as soft iron. Conversely, the tabs 223 may be deleted from the fan, and the blades themselves used to complete the magnetic circuit; but the flux path is not quite as efficient although workable.

It will be apparent from the foregoing that the term "sensing unit" may include a permanent magnet that rotates or otherwise moves with a portion of the machine to be controlled as well as a stationary permanent magnet closely related to a magnetically permeable portion of the machine. An oscillating permanent magnet moving in synchronism with the machine to be controlled is shown in Fig. 12 and a stationary permanent magnet closely associated with a moving magnetically permeable machine portion is indicated, for example, in Figs. 8, 9, 11 and 13. It makes no difference for the purposes of the invention whether the permanent magnet is in the fixed or movable portion of the magnetic circuit or whether the magnetically permeable moving element of the engine is used directly as a part of the sensing unit or a small piece of soft iron is secured to the moving element to increase its permeability or to provide permeability if the moving element used in non-permeable. It is only necessary that a magnetic circuit be made and broken to provide a variation in the flux linkage of the associated field coil so that a voltage varying with the speed of the machine to be controlled is established.

While the invention has been disclosed in conjunction with certain specific modifications it should be appreciated that numerous other modifications and changes will suggest themselves to those skilled in the art and that these are included within the scope of the appended claims.

What I claim is:

1. In a self-regulating control mechanism for automatically controlling the speed of a moving element of a machine having a magnetically permeable portion, the combination of control means to regulate the speed of movement of said moving element, a pressure responsive member connected to said control means for activation thereof, a fluid circuit connected to a source of fluid pressure and having a flow of fluid therethrough and communicating with said pressure responsive member, valve means in said fluid circuit for directing fluid therein to said pressure responsive member for effecting movements thereof, a sensing unit comprising a permanent magnet associated with a coil disposed to be mounted in operative relation to said magnetically permeable portion of said moving element for intermittent completion and interruption of the magnetic circuit through said sensing unit to generate a voltage varying as a function of the speed of said moving element, electro-magnetic means connected in a circuit with said sensing unit for producing force in said electro-magnetic means varying as a function of the speed of said movable element, a member responsive to changes in said force and connected to said valve means for actuation thereof for producing speed-restoring movements of said pressure responsive member and said control means with amplified forces acting thereon, said valve means and said force-responsive member being supported to be sufficiently sensitive to minute forces produced by small changes in the speed of said moving element to effect satisfactory automatic-speed-regulation thereof.

2. In a governor for automatically controlling the speed of an element of a machine having control means therefor, the combination of means to effect speed controlling movements of said control means comprising, a pressure responsive member operatively connected to actuate said control means, a fluid circuit having varying pressures therein and communicating with said pressure responsive member, valve means in said circuit subjectable to said varying pressures and directing fluid to said pressure responsive member for effecting speed-controlling movements thereof, said valve means including a movable valve member, frictionless swingable means imparting rigidity in one direction acting to support said movable valve member for frictionless movements in a direction transverse to said first named direction by maintaining said movable valve member suspended within the fluid controlled thereby free of surface contact with other elements of the governor during operational movements of said valve member, pressure regulating means controlling pressure in said circuit at said valve means to compensate for the effects thereon of said variations of said pressures in said circuit, and sensing means including substantially frictionless means responsive to changes in the speed of said machine-element and acting on said valve means to effect movements thereof for producing said speed controlling movements of said pressure responsive member and control means with amplified forces acting thereon.

3. The combination of elements defined in claim 2, and variable force biasing means acting on said pressure responsive member to oppose the forces produced thereon by pressure in said fluid circuit acting on said pressure responsive member, the force of said biasing means varying as a function of the movement of said pressure responsive member, said valve means controlling pressure on only one side of said pressure responsive member, said valve means including a mating valve member cooperating with said movable valve member, the configuration of said movable valve member in relation to said mating valve member being adapted to produce modulated pressures acting on said pressure responsive member to effect movement thereof as a function of the relative movement of said two valve members.

4. The combination of elements defined in claim 3, and said fluid circuit including at least two restrictions therein, said pressure-responsive member communicating with said circuit at a point between said two restrictions, said valve means varying the restrictive effect of at least one of said restrictions to modulate the pressures acting on said pressure responsive member.

5. The combination of means defined in claim 2, and movable means operatively connected to and operable with said control means for effecting application of forces acting on said supported movable valve member and varying as a function of the position of said control means.

6. The combination of elements defined in claim 2, in which said swingable means comprises a pair of substantially parallel leaf-spring means.

7. In a device to operate a movable controlled member in response to the rate of movement of a moving element of a machine having a magnetically permeable portion, the combination of means to effect movements of said controlled member comprising, a pressure responsive member operatively connected to actuate said movable member, a fluid circuit having a flow of fluid therethrough and communicating with said pressure responsive member, valve means in said circuit for directing fluid therein to said pressure responsive member for effecting movement thereof, a sensing unit comprising a permanent magnet associated with a coil disposed to be mounted in operative relation to said magnetically permeable portion of said moving element for intermittent completion and interruption of the magnetic circuit through said sensing unit to generate a voltage varying as a function of the speed of said moving element, electro-magnetic means connected in a circiut with said sensing unit for producing force in said electro-magnetic means varying as a function of the speed of said movable element, a member responsive to changes in said force and connected to said valve means for actuation thereof for providing speed-responsive movements of said pressure responsive member and said movable member with amplified forces acting thereon, said valve means being supported to be consistently responsive to minute changes in the speed of said moving element.

8. In a device to operate a movable controlled member in response to the rate of movement of a moving element of a machine having a magnetically permeable portion, the combination of means to effect movements of said controlled member comprising, a pressure responsive member operatively connected to actuate said movable member, a fluid circuit having a flow of fluid therethrough and communicating with said pressure responsive member, valve means in said circuit for directing fluid therein to said pressure responsive member for effecting movement thereof, a sensing unit comprising a permanent magnet associated with a coil disposed to be mounted in operative relation to said magnetically permeable portion of said moving element for intermittent completion and interruption of the magnetic circuit through said sensing unit to generate a voltage varying as a function of the speed of said moving element, electro-magnetic means connected in a circuit with said sensing unit for producing force in said electro-magnetic means varying as a function of the speed of said movable element, a member responsive to changes in said force and connected to said valve means for actuation thereof for providing speed-responsive movements of said pressure responsive member and said movable member with amplified forces acting thereon, said valve means being supported to be consistently responsive to minute changes in the speed of said moving element, and temperature responsive means disposed to act on said force-responsive member and said valve means to compensate for changes in force in said electro-magnetic means resulting from changes in the resistance in said circuit produced by changes in temperature.

9. In a self-regulating control mechanism for automatically controlling the speed of a moving element of a machine having a magnetically permeable portion, the combination of control means to regulate the speed of movement of said moving element, a pressure responsive member operatively connected to said control means for activation thereof, a fluid circuit connected to a source of fluid pressure and having a flow of fluid therethrough and communicating with said pressure responsive member, valve means in said fluid circuit for directing fluid therein to said pressure responsive member for effecting movements thereof, said valve means including a valve body member and a mating member cooperable therewith, substantially frictionless swingable means disposed to impart rigidity in one direction acting to support one of said valve members within the fluid controlled thereby for substantially frictionless movements in a direction transverse to said first-named direction and to prevent surface contact of said supported valve member during said operational movements thereof, a sensing unit comprising a permanent magnet associated with a coil disposed to be mounted in operative relation to said magnetically permeable portion of said moving element for intermittent completion and interruption of the magnetic circuit through said sensing unit to generate a voltage varying as a function of the speed of said moving element, electro-magnetic means connected in a circuit with said sensing unit for producing a force in said electro-magnetic means varying as a function of the speed of said moving element, a member responsive to changes in said force and connected to said supported valve member for actuation thereof for producing speed restoring movements of said pressure responsive member and said control means with amplified forces acting thereon.

10. In a governor for automatically controlling the speed of an engine having control means therefor, the combination of means to effect speed-controlling movements of said control means comprising, a pressure responsive member operatively connected to said control means for actuation thereof, a fluid circuit having a flow of fluid therethrough and communicating with said pressure-responsive member, valve means in said fluid circuit for directing fluid therein to said pressure-responsive member for effecting movements thereof, electromagnetic means associated with said engine to produce magnetic force varying as a function of engine speed, a member responsive to changes in said magnetic force and connected to said valve means for actuation thereof for producing speed-restoring movements of said pressure responsive member and said control means with amplified forces acting thereon, and substantially frictionless swingable means disposed to impart rigidity in one direction acting to support said valve means and said magnetic force responsive member for substantially frictionless movements in a direction transverse to said first-named direction and to prevent surface contact of said valve means during said operational movements thereof whereby to respond instantaneously and consistently to minute forces produced by small changes in engine speed.

11. In a governor for automatically controlling the speed of an engine having control means therefor and a magnetically permeable element associated with the engine normally moving as a function of the speed thereof, the combination of means to effect speed-controlling movements of said control means comprising, a pressure responsive member operatively connected to said control means for actuation thereof, a fluid circuit connected to a source of fluid pressure and having a flow of fluid therethrough and communicating with said pressure responsive member, valve means in said fluid circuit for directing fluid therein to said pressure responsive member for effecting movements thereof, said valve means including a valve body member and a mating member cooperable therewith, a sensing unit comprising a permanent magnet and a coil disposed to be mounted in relation to said magnetically permeable moving element for intermittent completion and interruption of the magnetic circuit through said sensing unit to generate a voltage varying as a function of the speed of said moving element, electro-magnetic means connected in a circuit with said sensing unit for producing a force in said electro-magnetic means varying as a function of the speed of said movable element, said electro-magnetic means including a member responsive to changes in said force and connected to said supported valve member for actuation thereof for producing speed-restoring movements of said pressure responsive member and said control means with amplified forces acting thereon, substantially frictionless biasing means opposing the forces produced by said electro-magnetic means, and leaf-spring means disposed to impart rigidity in one direction acting to support one of said valve members and said force-responsive member for substantially frictionless movements in a direction transverse to said first-named direction and to prevent surface contact of said supported valve member during said operational movements thereof whereby to respond instantaneously and consistently to minute forces produced by small changes in engine speed.

12. The combination of elements defined in claim 11, in which the engine has a passageway for the flow of air therethrough with variable air pressure in said passageway, and said fluid circuit has one end communicating with said passageway and its other end communicating with a region of pressure different from the air pressure in said passageway, and pressure regulating means controlling pressure in said circuit at said valve means to compensate for the effects thereon of the variation of pressure in said passageway.

13. In a governor for automatically controlling the speed of an engine having control means therefor, the combination of means to effect speed-controlling movements of said control means comprising, a pressure responsive member operatively connected to said control means for actuation thereof, a fluid circuit having a flow of fluid therethrough and communicating with said pressure-responsive member, valve means in said fluid circuit for directing fluid therein to said pressure-responsive member for effecting movements thereof, electromagnetic means associated with said engine to produce magnetic force varying as a function of engine speed, a member responsive to changes in said magnetic force and connected to said valve means for actuation thereof for producing speed-restoring movements of said pressure responsive member and said control means with amplified forces acting thereon, and substantially frictionless swingable means disposed to impart rigidity in one direction acting to support said valve means and said magnetic force-responsive member for substantially frictionless movements in a direction transverse to said first-named direction and to prevent surface contact of said valve means during said operational movements thereof whereby to respond instantaneously and consistently to minute forces produced by small changes in engine speed, and movable means connected to and operable with said control means for producing forces acting on said valve means and varying in accordance with the movement of said control means to control the amount of speed variation of the governor.

14. In a governor for automatically controlling the speed of an engine having control means and a passageway for the flow of air therethrough and variable air pressure in said passageway, the combination of means to effect speed-controlling movements of said control means comprising, a pressure responsive member operatively connected to actuate said control means, a fluid circuit communicating with said pressure responsive member and having one end communicating with said passageway and its other end communicating with a region of pressure different from the air pressure in said passageway, valve means in said air circuit for directing air therein to said pressure-responsive member for effecting movements thereof, pressure-regulating means controlling pressure in said circuit at said valve means to compensate for the effects thereon of the variation of pressure in said passageway, and means responsive to changes in engine speed and acting on said valve means to effect movements thereof for producing speed-controlling movements of said pressure responsive member and control means with amplified forces acting thereon.

15. The combination of elements defined in claim 14, in which said control means comprises a throttle in said passageway, and said one end of said circuit communicating with said passageway on the engine side of said throttle for utilizing intake passageway vacuum to induce air flow through said circuit, and said pressure regulating means maintaining predetermined vacuum at said valve means irrespective of normal variations of said intake passageway vacuum effected by changes in the position of said throttle and the speed of the engine.

16. The combination of elements defined in claim 15, and variable force biasing means acting on said pressure responsive member to oppose the forces produced thereon by vacuum in said air circuit acting on said pressure responsive member, the force of said biasing means varying as a function of the movement of said pressure responsive member, said valve means controlling vacuum on only one side of said pressure responsive member, said valve means including first and second cooperating valve members, the configuration of said first valve member in relation to said second valve member being adapted to produce modulated vacuum acting on said pressure responsive member to effect movement thereof as a function of the relative movement of said two valve members.

17. In a governor for an engine in which the governor operates to regulate an engine control member to maintain engine speed at a governed value, a sealed emergency means to render the governor inoperative to control the movement of said control member for maintaining the governed engine speed, and manually operated means disposed for substantially instantaneous operation and operable to break said sealed means while the engine is operating, whereby said control member can be moved suddenly to any position and the engine speed increased to exceed the governed value.

18. In a governor for an engine having a speed controlling member, said governor including a fluid pressure responsive device to regulate said controlling member to maintain engine speed at a governed value, the combination of sealed emergency means operable substantially instantaneously to control the pressure in said pressure responsive device to render said pressure responsive device inoperative to control the movement of said controlling member for maintaining the governed engine speed, and manually operable means to break said sealed means, whereby said controlling member can be moved suddenly in an unrestricted manner and the engine speed increased to exceed the governed value.

19. In a governor for automatically controlling the speed of an engine having control means therefor, the combination of means to effect speed-controlling movements of said control means comprising, a pressure responsive member operatively connected to actuate said control means, a fluid circuit having a flow of fluid therethrough and communicating with said pressure responsive member, valve means in said fluid circuit for directing fluid therein to said pressure responsive member for effecting movements thereof, movable sensing means responsive to changes in engine speed and producing forces acting on said valve means to effect movements thereof for producing speed controlling movements of said pressure responsive member, a main spring acting on said valve means to oppose said forces produced by said speed-sensing means, and a second spring acting on said valve means and operable by means operatively connected to said control means for producing forces acting on said valve means and varying as a function of the position of said control means to control the speed variation of the governor.

20. In a governor for automatically controlling the speed of an engine having control means therefor, the combination of means to effect speed-controlling movements of said control means comprising, a pressure-responsive member operatively connected to actuate said control means, a fluid circuit having a flow of fluid therethrough and communicating with said pressure responsive member, valve means in said fluid circuit for directing fluid therein to said pressure-responsive member for effecting movements thereof, means responsive to changes in engine speed and acting on said valve means to effect movements thereof for producing speed-controlling movements of said pressure-responsive member and said control means with amplified forces acting thereon, movable cam means connected to and operable with said control means for producing forces acting on said valve means and varying in accordance with the movement of said control means to control the amount of speed variation of the governor, said cam means being rotatably adjustable, eccentric means disposed for setting said cam means in a desired rotary position, and locking means to lock said cam in said desired position.

21. In a speed control system for automatically controlling the speed of an engine of an automotive vehicle having an accelerator connected by linkage mechanism to a rotatable throttle-controlling shaft in the air intake passage of the engine such that a spring biases said linkage mechanism and throttle toward the idle position, the combination of, a lever member connected for rotation with said throttle shaft, a governor mechanism having a link directly connected to said lever and having a spring disposed to move said lever and said throttle in an increase-speed direction, said governor including speed-responsive mechanism to oppose and overpower said governor spring for moving said throttle in a decrease-speed direction when the speed tends to exceed the governed value, said linkage mechanism including a member abuttingly contacting said lever in a manner such that said linkage-mechanism-spring overpowers said governor spring at all speeds below the governed speed, whereby said accelerator completely controls said throttle, and when said accelerator is moved to a position corresponding to a speed in excess of the governed speed said governor mechanism causes said lever to move out of contact with said abutting member of said linkage mechanism whereby said throttle is controlled entirely by said governor.

22. In a speed control system for automatically controlling the speed of an engine of an automotive vehicle having an accelerator connected by linkage mechanism to a rotatable throttle-controlling shaft in the air intake passage of the engine such that a spring biases said linkage mechanism and throttle toward the idle position, the combination of, a lever member connected for rotation with said throttle shaft, a governor mechanism having a link directly connected to said lever and having a spring disposed to move said lever and said throttle in an increase-speed direction, said governor including speed-responsive mechanism to oppose and overpower said governor spring for moving said throttle in a decrease-speed direction when the speed tends to exceed the governed value, said linkage mechanism including a member abuttingly contacting said lever in a manner such that said linkage-mechanism-spring overpowers said governor spring at all speeds below the governed speed, whereby said accelerator completely controls said throttle, and when said accelerator is moved to a position corresponding to a speed in excess of the governed speed said governor mechanism causes said lever to move out of contact with said abutting member of said linkage mechanism whereby said throttle is controlled entirely by said governor, and sealed casing means having an aperture disposed to receive said throttle shaft to enclose said lever and said governor link, whereby to render said combination tamper-proof.

23. In a self-regulating control mechanism for automatically controlling the speed of a moving element of a machine having a magnetically permeable portion, the combination of control means to regulate the speed of movement of said moving element, a pressure responsive member operatively connected to said control means for activation thereof, a fluid circuit connected to a source of fluid pressure and having a flow of fluid therethrough and communicating with said pressure responsive member, at least two fluid restrictions in said circuit, said pressure responsive member communicating with said circuit at a point between said two restrictions, valve means in said circuit to vary the restrictive effect of at least one of said restrictions to modulate the pressures acting on said pressure responsive member, a sensing unit comprising a permanent magnet associated with a coil disposed to be mounted in operative relation to said magnetically permeable portion of said moving element for intermittent completion and interruption of the magnetic circuit through said sensing unit to generate a voltage varying as a function of the speed of said moving element, electro-magnetic means connected in a circuit with said sensing unit for producing force in said electro-magnetic means varying as a function of the speed of said movable element, a member responsive to changes in said force and connected to said valve means for actuation thereof for producing speed-restoring movements of said pressure responsive member and said control means with amplified forces acting thereon, said valve means and said force-responsive member being supported to be sufficiently sensitive to minute forces produced by small changes in the speed of said moving element to effect satisfactory automatic-speed-regulation thereof, and movable means connected to and operable with said control means for producing forces acting on said force-responsive member and said valve means and varying in accordance with the movements of said control means to control the broadness of said speed regulation.

24. In a governor for automatically controlling the speed of a machine having control means therefor, the combination of means to effect speed controlling movements of said control means comprising, a pressure responsive member operatively connected to actuate said control means, a fluid circuit connected to a source of fluid pressure having varying pressures therein and communicating with said pressure responsive member, valve means including a movable valve member in said circuit, said valve member being subjectable on one end thereof to said varying pressure and on its other end to a pressure different from said varying pressure and directing fluid to said pressure responsive member for effecting movements thereof, pressure regulating means controlling pressure in said circuit acting on at least one of said two ends of said valve member to compensate for the effects thereon of said variations of said pressures in said circuit, and means responsive to changes in the speed of said machine acting on said valve means to effect movements thereof for producing speed controlling movements of said pressure responsive member and control means with amplified forces acting thereon.

25. The combination of means defined in claim 24, and variable force biasing means acting on said pressure responsive member to oppose the forces produced thereon by pressure in said fluid circuit acting on said pressure responsive member, the force of said biasing means varying as a function of the movement of said pressure responsive member, said valve means controlling pressure on only one side of said pressure responsive member, said valve means including first and second cooperating valve members, the configuration of said first valve member in relation to said second valve member being adapted to produce modulated pressures acting on said pressure responsive member to effect movement thereof as a function of the relative movement of said two valve members.

26. The combination of elements defined in claim 25, and movable means connected to and operable with said control means for effecting application of forces acting on said valve means and varying in accordance with the movements of said control means to control the broadness of the speed regulation of the governor.

27. The combination of elements defined in claim 25, in which said fluid pressure source transmits variable pressures to said fluid circuit, and in which said pressure-regulating means is installed between said source and said valve means to supply a substantially constant pressure to said valve means.

28. In a governor for automatically controlling the speed of a machine having control means therefor, the combination of means to effect speed controlling movements of said control means comprising, a pressure responsive member operatively connected to actuate said control means, a fluid circuit for the flow of fluid therethrough communicating with said pressure responsive member, valve means in said circuit for directing fluid to said pressure responsive member for effecting movements thereof, said valve means including a valve body element and a mating element cooperable therewith, substantially frictionless swingable leaf spring means disposed to impart rigidity in one direction acting to support one of said valve members within the fluid controlled thereby for substantially frictionless movements in a direction transverse to said first named direction and to prevent surface contact of said supported valve member during said operational movements thereof, means responsive to changes in the speed of said machine and acting on said supported valve member to effect movements thereof for producing speed controlling movements of said pressure responsive member and control means with amplified forces acting thereon, said last means or said fluid in said circuit being adversely affected by changes in temperature thereof, said leaf spring means being made of bi-metal and tending to move in response to said changes in temperature to compensate for the net effects of said adverse temperature changes.

29. The combination of means defined in claim 19 in which said last named means connected to said control means includes a cam operable by said control means and having a contour to vary the force of said second spring as a predetermined function of the position of said control means.

30. The combination of means defined in claim 19, and leaf spring means imparting rigidity in one direction acting to support said valve means for substantially frictionless movements in a direction transverse to said first named direction by maintaining said valve means suspended within the fluid controlled thereby free of surface contact with other elements of the governor during operational movements of said valve means, and said sensing means including frictionless movable means operatively connected to said valve means to effect cooperative frictionless movements thereof.

31. In a governor mechanism for automatically regulating the speed of a rotating element of a machine having movable control means therefor and to maintain a maximum limiting value of the speed of said rotating element, a fluid circuit connected to a source of fluid pressure to induce a flow of fluid therethrough, a pressure responsive member operatively connected to said control means to effect speed-regulating movements thereof and communicating on one side thereof with said circuit, valve means in said circuit to control pressures on said one side of said pressure responsive member acting to move said control means in a reduce-speed direction, means biasing said control means in an increase-speed direction to oppose the forces produced by said pressures acting on said pressure responsive member, sensing means responsive to changes in the speed of said machine-element to effect said pressure-controlling movements of said valve means for effecting said speed-regulating movements of said pressure responsive member, second valve means in said fluid circuit, and manually operable means operatively connected to said second valve means for shutting off the fluid pressure to said pressure responsive member to permit said biasing means to move said control means to any desired high-speed position for exceeding in emergencies the said maximum limiting value of the speed of said element.

32. In a governor for automatically controlling the speed of an element of a machine having control means therefor, the combination of means to effect speed controlling movements of said control means comprising, a pressure responsive member operatively connected to actuate said control means, a first fluid circuit having varying pressures therein and communicating with said pressure responsive member, valve means in said first circuit subjectable to said varying pressures and directing fluid to said pressure responsive member for effecting movements thereof, a second fluid circuit communicating with a source of fluid pressure for inducing a flow of fluid therethrough, two restrictions in said second fluid circuit, said first fluid circuit communicating with said second fluid circuit between said two restrictions to subject said valve means to pressure existing therebetween, pressure regulator means controlling pressure existing in said second circuit between said two restrictions and in said first circuit at said valve means to compensate for the effects thereon of said variations of said pressures in said circuits, said pressure regulator means including valve means to vary the retrictive effect of one of said two restrictions in response to changes in circuit pressure between said two restrictions and at said valve means for regulating said last named circuit pressure in a predetermined manner, and sensing means responsive to changes in the speed of said machine-element and acting on said valve means to effect movements thereof for producing speed controlling movements of said pressure responsive member and control means with amplified forces acting thereon.

33. In a governor for automatically controlling the speed of an element of a machine having control means therefor, the combination of means to effect speed controlling movements of said control means comprising, a pressure responsive member operatively connected to actuate said control means, a fluid circuit connected to a source of fluid pressure to induce a flow of fluid therethrough and communicating with said pressure responsive member, valve means in said fluid circuit to control pressure therein acting on said pressure responsive member for effecting speed-controlling movements thereof, and sensing means responsive to changes in the speed of said machine-element and acting on said valve means to effect movements thereof for producing said speed controlling movements of said pressure responsive member and control means with amplified forces acting thereon, said sensing means or said fluid in said circuit being adversely affected by changes in temperature thereof, and a bimetal spring acting on said valve means to produce forces thereon in response to said changes in temperature to compensate for the net effects of said adverse temperature changes.

References Cited in the file of this patent
UNITED STATES PATENTS

| | | |
|---|---|---|
| 2,177,537 | Sloan | Oct. 24, 1939 |
| 2,260,576 | Maybach | Oct. 28, 1941 |
| 2,468,667 | Holbrook | Apr. 26, 1949 |
| 2,566,083 | Endsley et al. | Aug. 28, 1951 |
| 2,645,474 | Barnes | July 14, 1953 |
| 2,685,871 | Block | Aug. 10, 1954 |